(12) United States Patent
Youk

(10) Patent No.: US 7,779,979 B2
(45) Date of Patent: Aug. 24, 2010

(54) SYNCHRONIZING DEVICE FOR A MANUAL TRANSMISSION

(75) Inventor: Young Chan Youk, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 529 days.

(21) Appl. No.: 11/511,608

(22) Filed: Aug. 28, 2006

(65) Prior Publication Data

US 2007/0137969 A1    Jun. 21, 2007

(30) Foreign Application Priority Data

Dec. 19, 2005    (KR)    ....................... 10-2005-0125691

(51) Int. Cl.
*F16D 13/14*    (2006.01)
(52) U.S. Cl. ..................... 192/65; 192/72; 192/93 C
(58) Field of Classification Search .................. 192/65, 192/72, 77, 78, 93 C
See application file for complete search history.

(56) References Cited

U.S. PATENT DOCUMENTS

| | | | | |
|---|---|---|---|---|
| 683,525 A | * | 10/1901 | Tuttle ........................... | 192/78 |
| 786,306 A | * | 4/1905 | Neckerman .................... | 192/65 |
| 2,076,648 A | * | 4/1937 | Jones ........................... | 74/375 |
| 3,009,747 A | * | 11/1961 | Pitzer ........................... | 192/72 |
| 3,539,043 A | * | 11/1970 | Brochetti .................. | 192/56.55 |
| 4,425,816 A | * | 1/1984 | Toyoda ......................... | 74/439 |

* cited by examiner

*Primary Examiner*—Rodney H Bonck
(74) *Attorney, Agent, or Firm*—Edwards Angell Palmer & Dodge LLP; Peter F. Corless; Kongsik Kim

(57) ABSTRACT

A synchronizing device for a manual transmission for synchronizing rotation speeds of a rotating shaft and a shift gear that includes in preferred aspects at least one first ring disposed on an exterior circumference of the rotating shaft and having an exterior sloped surface at its exterior circumference, at least one second ring disposed on an interior circumference of the shift gear and having an internal sloped surface contacting the exterior slope surface of the first ring, and an actuator unit applying an axial directional load to the at least one first ring or the at least one second ring.

6 Claims, 3 Drawing Sheets

Non-synchronized state

Synchronized state (a) Non-synchronized state (b) Synchronized state

SYNCHRONIZING DEVICE FOR A MANUAL TRANSMISSION

CROSS-REFERENCE TO RELATED APPLICATION

This application claims priority to and the benefit of Korean Patent Application No. 10-2005-0125691 filed in the Korean Intellectual Property Office on Dec. 19, 2005, the entire contents of which are incorporated herein by reference.

BACKGROUND OF THE INVENTION (a) Field of the Invention

The present invention relates to a manual transmission. More particularly, the present invention relates to a synchronizing device for a manual transmission.

(b) Description of the Related Art

As is well known in the art, a typical manual transmission shifts gears according to a manual operation of a driver. Such a manual transmission is provided with a plurality of gears disposed on a rotating shaft, and realizes a desired shift-speed by synchronizing the rotating shaft to one of the plurality of gears. Therefore, in order to realize a desired shift-speed, a synchronizing device that enables rotational synchronization of the rotating shaft and the gears is required.

Conventionally, the rotating shaft and a gear thereon are synchronized by a so-called synchronizer mechanism. Such a synchronizer mechanism includes a synchronizer ring formed in a gear structure, and thus it is very complex in structure. Further, the synchronizer mechanism becomes larger in size due to such a complex structure, and thus, it is a main cause of an increase in volume of a transmission.

In addition, according to the conventional synchronizer mechanism, the rotating shaft and the shift gear that are rotating at different speeds are synchronized by an engagement of gear teeth. Therefore, in order to provide sufficiently smooth operation, parts of the synchronizer mechanism should be very precisely designed and carefully handled in manufacturing.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention includes a synchronizing device for a manual transmission having advantages of compactness and versatility for engines of various torques.

In a preferred embodiment, a synchronizing device of the invention for a manual transmission for synchronizing rotation speeds of a rotating shaft and a shift gear, wherein the synchronizing device includes:

at least one first ring disposed on an exterior circumference of the rotating shaft and having an exterior sloped surface at its exterior circumference;

at least one second ring disposed on an interior circumference of the shift gear and having an internal sloped surface contacting the exterior sloped surface of the first ring; and an actuator unit applying an axial directional load to the at least one first ring or the at least one second ring.

The at least one second ring suitably may be divided at a predetermined circumferential position.

The at least one first ring and the at least one second ring suitably may respectively be plural.

Suitably, at least one of the plurality of first rings may be slidable on the rotating shaft in an axial direction thereof.

A first supporting step may be formed on the exterior circumference of the rotating shaft so as to support an innermost first ring opposite to the actuator unit among the plurality of first rings, and a second supporting step may be formed on the interior circumference of the shift gear so as to prevent an escape of an outermost second ring close to the actuator unit among the plurality of second rings.

The at least one first ring and the at least one second ring may respectively have a cross-section of a right triangle.

In another aspect, motor vehicles are provided that comprise a described synchronizing device for a manual transmission.

In a further aspect, motor vehicles are provided that comprise a manual transmission as disclosed herein a synchronizing device.

It is understood that the term "vehicle" or other similar term as used herein is inclusive of motor vehicles in general such as passenger automobiles, buses, trucks, various commercial vehicles, and the like.

Other aspects of the invention are discussed infra.

DETAILED DESCRIPTION

In one aspect, the invention includes a synchronizing device suitable for use with a manual transmission for synchronizing rotation speeds of a rotating shaft and a shift gear. Preferred synchronizing devices of the invention comprise: at least one first ring disposed on an exterior circumference of the rotating shaft; at least one second ring disposed on an interior circumference of the shift gear. Preferably, the synchronizing device also may comprise an actuator unit applying an axial directional load to the at least one first ring or the at least one second ring.

An exemplary embodiment of the present invention will hereinafter be described in detail with reference to the accompanying drawings.

As referred to herein, the term "manual transmission" should not be understood as a narrow meaning confined to a conventional manual transmission. On the contrary, the term should be understood to cover various transmissions where a plurality of gears are disposed on a rotating shaft, and a desired shift-speed is realized by synchronizing the rotating shaft to the plurality of gears.

Figure 1:
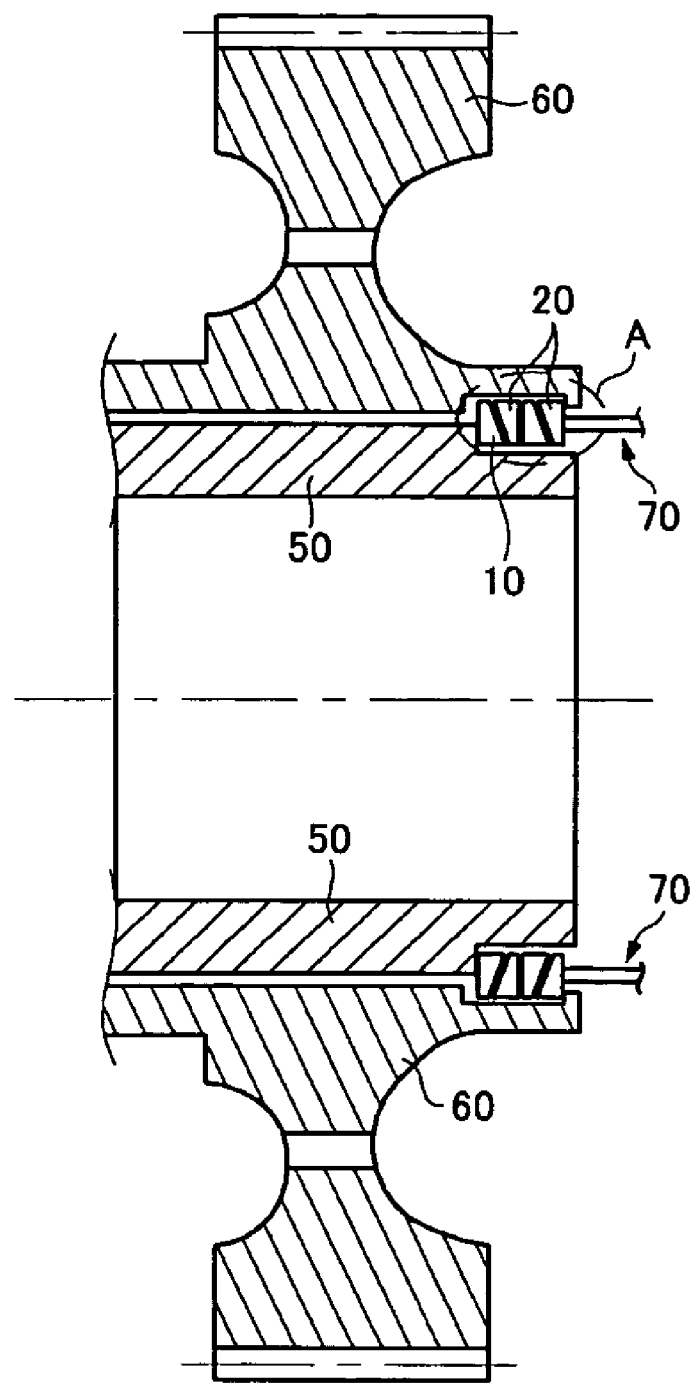
FIG. 1 is a cross-sectional view illustrating a synchronizing device for a manual transmission according to an exemplary embodiment of the present invention.

FIG. 1 is a cross-sectional view illustrating a synchronizing device for a manual transmission according to an exemplary embodiment of the present invention.

As shown in FIG. 1, a synchronizing device for a manual transmission according to an exemplary embodiment of the present invention synchronizes rotation speeds of a rotating shaft 50 disposed in the manual transmission and a shift gear 60 disposed on the rotating shaft 50.

As shown in FIG. 1, such a synchronizing device for a manual transmission according to an exemplary embodiment of the present invention includes a plurality of first rings 10, a plurality of second rings 20, and an actuator unit 70.

The plurality of first rings 10 are disposed on an exterior circumference of the rotating shaft 50. Each of the plurality of first rings 10 are provided with an exterior slope surface at its exterior circumference.

The plurality of second rings 20 are disposed on an interior circumference of the shift gear 60. Each of the plurality of second rings 20 are suitably provided with an interior sloped surface contacting the exterior slope surface of the first ring 10. For example, the plurality of first rings 10 and the plurality of second rings 20 respectively have cross-sections of a right triangular shape. That is, the first rings 10 and the second rings 20 are respectively formed in a generally conical shape.

The actuator unit 70 applies an axial directional load to the first ring 10 or the second ring 20.

In more detail, the actuator unit 70 suitably may be realized in a variety of fashions. For example, the axial directional force may be applied to the first ring 10 or the second ring 20 by moving a push rod forward by a hydraulic piston. As another example, a hydraulic chamber may be formed on the rotating shaft 50 so as to apply the axial directional force by a hydraulic piston.

A supporting step 55 is formed on the exterior circumference of the rotating shaft 50 so as to support an innermost first ring opposite to the actuator unit 70 among the plurality of first rings 10. In addition, a supporting step 65 is preferably formed on the interior circumference of the shift gear 60 so as to prevent escape of an outermost second ring close to the actuator unit 70 among the plurality of second rings 20.

The first rings 10 except the innermost first ring among the plurality of first rings 10 are suitably disposed on the rotating shaft 50 so as to be slidable in an axial direction thereof.

Figure 2:
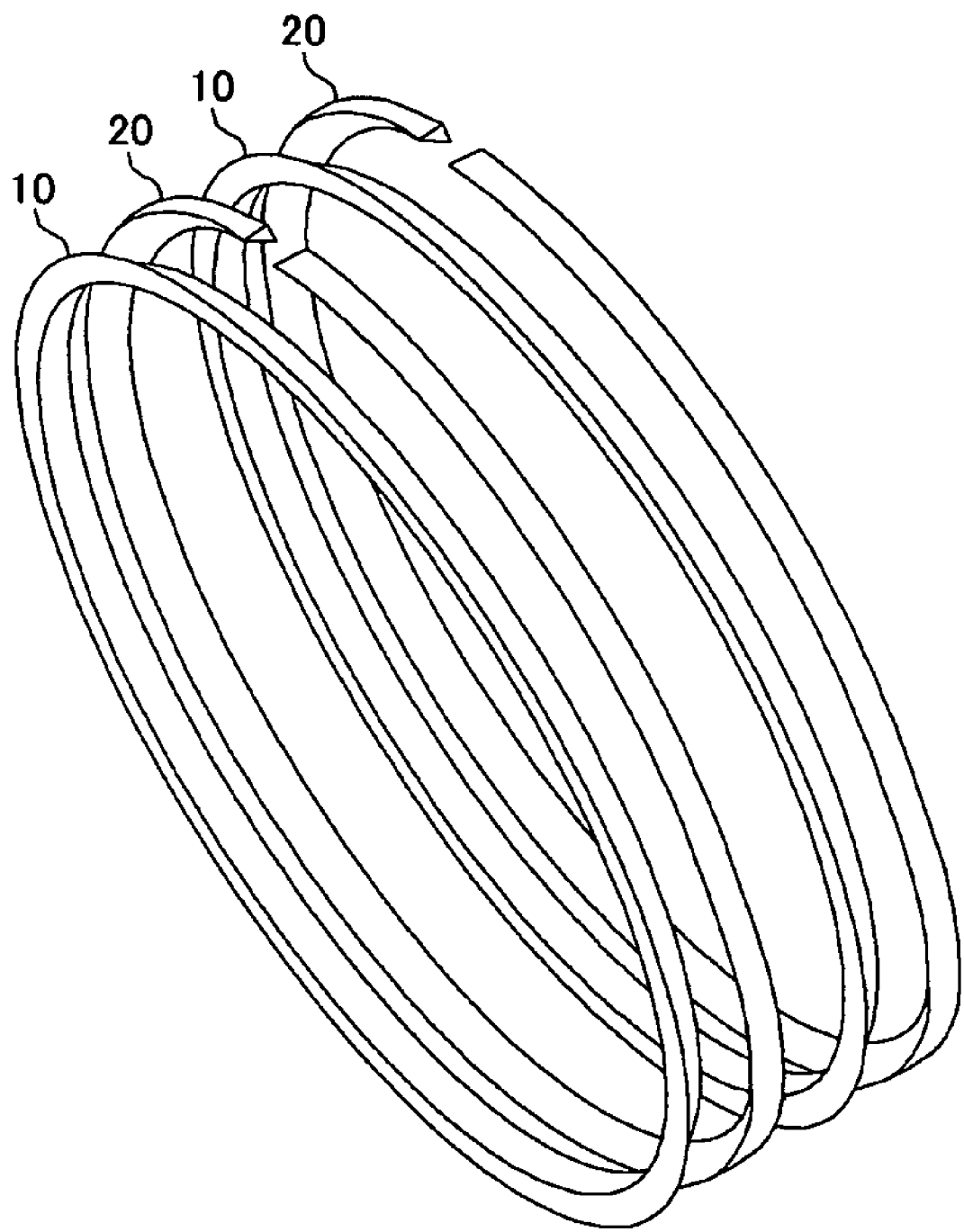
FIG. 2 is a perspective view illustrating a combination of conical rings used in a synchronizing device for a manual transmission according to an exemplary embodiment of the present invention.
Figure 3:
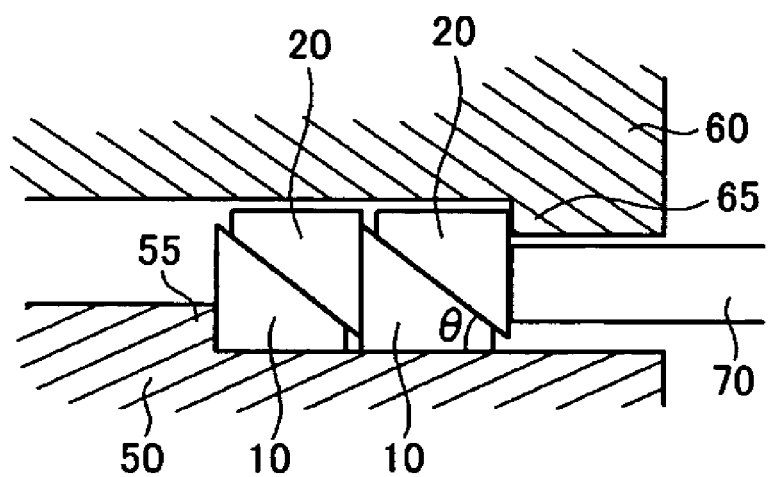
FIGS. 3 (*a*) and (*b*) are enlarged views of A in FIG. 1, and illustrate a synchronizing operation of a rotating shaft and a gear thereon in a synchronizing device for a manual transmission according to an exemplary embodiment of the present invention.
Figure 3:
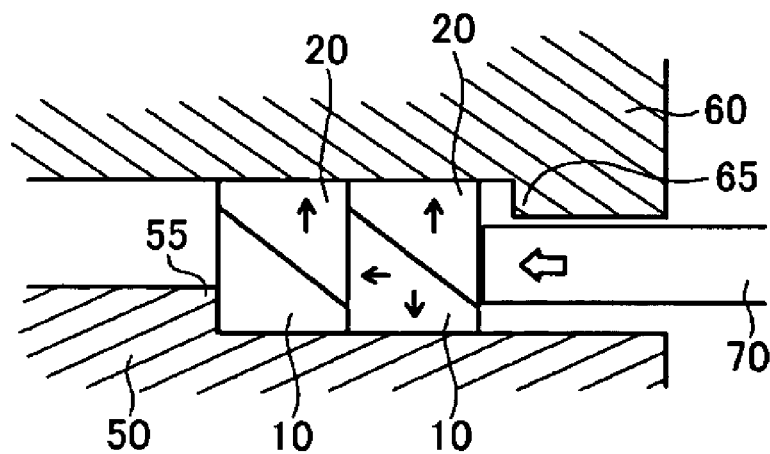

As shown in FIG. 2, each of the plurality of second rings 20 is preferably divided at a predetermined circumferential position. Therefore, referring to FIG. 3, upon receiving an axial directional force from the actuator unit 70, the divided portion of the second ring 20 is widened such that it may slide on the exterior slope surface of the first ring 10 while a radius of the second ring 20 increases. By such an operation, the second ring 20 suitably may closely contact the interior circumference of the shift gear 60 by the operation of the actuator unit 70. By such a contacting force, the rotating shaft 50 and the shift gear 60 become integral, and thus their rotation speeds can become synchronized.

In the above exemplary embodiment, it is described that the first rings 10 and the second rings 20 are respectively provided as pluralities. However, it should be understood that the scope of the present invention is not limited thereto, since the spirit of the present invention may be applied, inter alia, to the case that a single first ring 10 and a single second ring 20 are provided.

In an exemplary embodiment of the present invention, a slope angle θ formed by the slope surface of the first ring 10 and the exterior circumference of the rotating shaft 50 may be, for example, 45°. However, it should be understood that the scope of the present invention not limited thereto. When the slope angle θ is small, axial directional movement of the first and second rings 10 and 20 becomes large, and a large synchronized coupling force may be obtained with a small axial directional force. When the slope angle θ is large, opposite effects are obtained. Therefore, the transmission may be easily modified to cover various engine torques, by varying the level of the slope angle. That is, for different engines of various torques, the basic structure of the transmission is not required to be altered, but merely replacing the first and second rings 10 and 20 may suffice.

In the above exemplary embodiment, it is described that the first ring 10 and the second ring 20 have a generally conical shape. However, it should be understood that the scope of the present invention is not limited thereto. For instance, cross-sectional shape of the first and second rings may be changed in a variety of fashions.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, the rotating shaft and the shift gear may be synchronized by a very simple operation, and thus, the transmission may become structurally simpler. Accordingly, the weight of the transmission may be decreased.

Further, according to an exemplary embodiment of the present invention, transmissions of various torque capacities may be realized by merely replacing the first and second rings.

What is claimed is:

1. A synchronizing device for a manual transmission for synchronizing rotation speeds of a rotating shaft and a shift gear, the synchronizing device comprising:

at least one first ring disposed on an exterior circumference of the rotating shaft and having an exterior sloped surface at its exterior circumference;

at least one second ring disposed on an interior circumference of the shift gear and having an internal sloped surface contacting the exterior sloped surface of the first ring; and an actuator unit selectively applying an axial directional load to the at least one first ring or the at least one second ring so as to engage the shift gear or release the shift gear from the rotating shaft by frictional force between the first and second rings, wherein the synchronizing device comprises a plurality of first rings and a plurality of second rings, and a first supporting step is formed on the exterior circumference of the rotating shaft so as to support an innermost first ring opposite to the actuator unit among the plurality of first rings; and a second supporting step is formed on the interior circumference of the shift gear so as to prevent escape of an outermost second ring close to the actuator unit among the plurality of second rings.

2. The synchronizing device of claim 1, wherein the plurality of second rings is divided at a predetermined circumferential position.

3. The synchronizing device of claim 1, wherein at least one of the plurality of first rings is slidable on the rotating shaft in an axial direction thereof.

4. The synchronizing device of claim 1, wherein the plurality of first rings and the plurality of second rings respectively have a cross-section of a right triangle.

5. A manual transmission comprising a synchronizing device of claim 1.

6. A motor vehicle comprising a synchronizing device of claim 1.

* * * * *